(12) United States Patent
Chen

(10) Patent No.: US 6,628,514 B2
(45) Date of Patent: Sep. 30, 2003

(54) FASTENER FOR SECURING A DATA STORAGE DEVICE TO A BRACKET

(75) Inventor: Yun Lung Chen, Taipei (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 147 days.

(21) Appl. No.: 09/955,793

(22) Filed: Sep. 19, 2001

(65) Prior Publication Data

US 2003/0053292 A1 Mar. 20, 2003

(51) Int. Cl.[7] .................................. G06F 1/16
(52) U.S. Cl. ................. 361/685; 361/726; 248/220.31; 312/223.2; 174/138 G
(58) Field of Search ............... 361/683–685, 361/724–727, 730–732, 735, 805, 807, 809, 810, 825; 312/223.1, 223.2, 298, 317.1, 350, 334.1, 333, 216, 218, 251.1, 330.1, 330.2; 248/68.1, 73, 27.3, 201, 208.7, 309.2, 231.9, 220.31, 224.8, 581, 609, 611, 500; 24/297, 295, 457, 300, 301; 174/138 G; 292/31, 106, 101; 20/453, 525; 307/53

(56) References Cited

U.S. PATENT DOCUMENTS

| | | | | |
|---|---|---|---|---|
| 4,980,800 A | * | 12/1990 | Furuta | 361/727 |
| 5,587,889 A | * | 12/1996 | Sacherman | 361/809 |
| 5,801,920 A | * | 9/1998 | Lee | 361/685 |
| 6,256,204 B1 | * | 7/2001 | Wormsbecher et al. | 361/727 |
| 6,293,636 B1 | * | 9/2001 | Le et al. | 312/223.2 |
| 6,297,952 B1 | * | 10/2001 | Liu et al. | 361/685 |
| 6,302,737 B1 | * | 10/2001 | Billman | 439/607 |
| 6,330,147 B1 | * | 12/2001 | Adams et al. | 361/679 |
| 6,330,991 B1 | * | 12/2001 | Boe | 248/200 |
| 6,343,009 B1 | * | 1/2002 | Liu et al. | 361/684 |
| 6,385,036 B1 | * | 5/2002 | Chien | 361/683 |
| 6,456,489 B1 | * | 9/2002 | Davis et al. | 361/684 |
| 6,473,313 B1 | * | 10/2002 | Chen et al. | 361/801 |

* cited by examiner

Primary Examiner—Michael Datskovsky
(74) Attorney, Agent, or Firm—Wei Te Chung

(57) ABSTRACT

A fastener (30) securing a data storage device (10) to a bracket (20) includes a generally arcuate base (32), and a pair of elastically deflectable first and second arms (34, 36) extending from free ends of the base. A pair of barbs (38) is respectively formed on opposite lateral sides of a free end of each of the first and second arms. A protrusion (40) is formed on an outer face of each of the first and second arms, generally between a corresponding pair of barbs. The arms are inserted into an opening (22) of the bracket and a corresponding hole (14) of a side panel of the data storage device. The barbs interferentially clasp an inner surface of the side panel at a periphery of the hole. The protrusions are received in a pair of cutouts (24) defined in the bracket in communication with the opening.

20 Claims, 5 Drawing Sheets

FASTENER FOR SECURING A DATA STORAGE DEVICE TO A BRACKET

BACKGROUND OF THE INVENTION

1. Field of the Invention

The present invention relates to elastically deflectable fasteners, and to fasteners which readily and firmly secure a computer data storage device to a bracket.

2. Description of Related Art

Typically, a computer data storage device is directly secured to a bracket using screws. Installation and removal of screws with a tool is unduly complicated and laborious, and reduces the efficiency of assembly in mass production facilities.

A common means to overcome the above shortcomings is to have a pair of slideways formed in a bottom portion of opposite side walls of the bracket. A sliding rail is attached to each side of the data storage device. Thus, the data storage device can readily slide into and be secured to the bracket. Unfortunately, the sliding rails themselves are secured to the data storage device with screws. Thus use of the sliding rails does not significantly simplify the assembly procedure.

A common means to further simplify the assembly procedure is to have a pair of plastic plates attached to opposite sides of the data storage device. The plates can secure the data storage device to a bracket without any tool. However, gaps are created between the data storage device and the bracket. This results in increased risk of excessive Electromagnetic Interference (EMI).

Examples of the abovementioned mechanisms are disclosed in Taiwan Patent Applications Nos. 78201813, 79209891, 82207667, and 82202204; and U.S. Pat. Nos. 5,510,955 and 5,262,923.

SUMMARY OF THE INVENTION

Accordingly, an object of the present invention is to provide a fastener which readily and firmly secures a data storage device to a bracket without the need for tools.

In order to achieve the object set out above, a fastener of the present invention for securing a data storage device to a bracket comprises a base and a pair of elastically deflectable first and second arms. The base is generally arcuate. The arms extend from free ends of the base. A pair of barbs is respectively formed on opposite lateral sides of a free end of each of the first and second arms. A protrusion is formed on an outer face of each of the first and second arms, generally between a corresponding pair of barbs. The arms of the fastener are inserted into an opening of the bracket and a corresponding hole of a side panel of the data storage device. The barbs interferentially clasp an inner surface of the side panel at a periphery of the hole. The protrusions of the arms are received in a pair of cutouts defined in the bracket in communication with the opening. Thus, the fastener secures the data storage device to the bracket.

Other objects, advantages and novel features of the present invention will become more apparent from the following detailed description when taken in conjunction with the accompanying drawings.

DETAILED DESCRIPTION OF THE INVENTION

Figure 1:
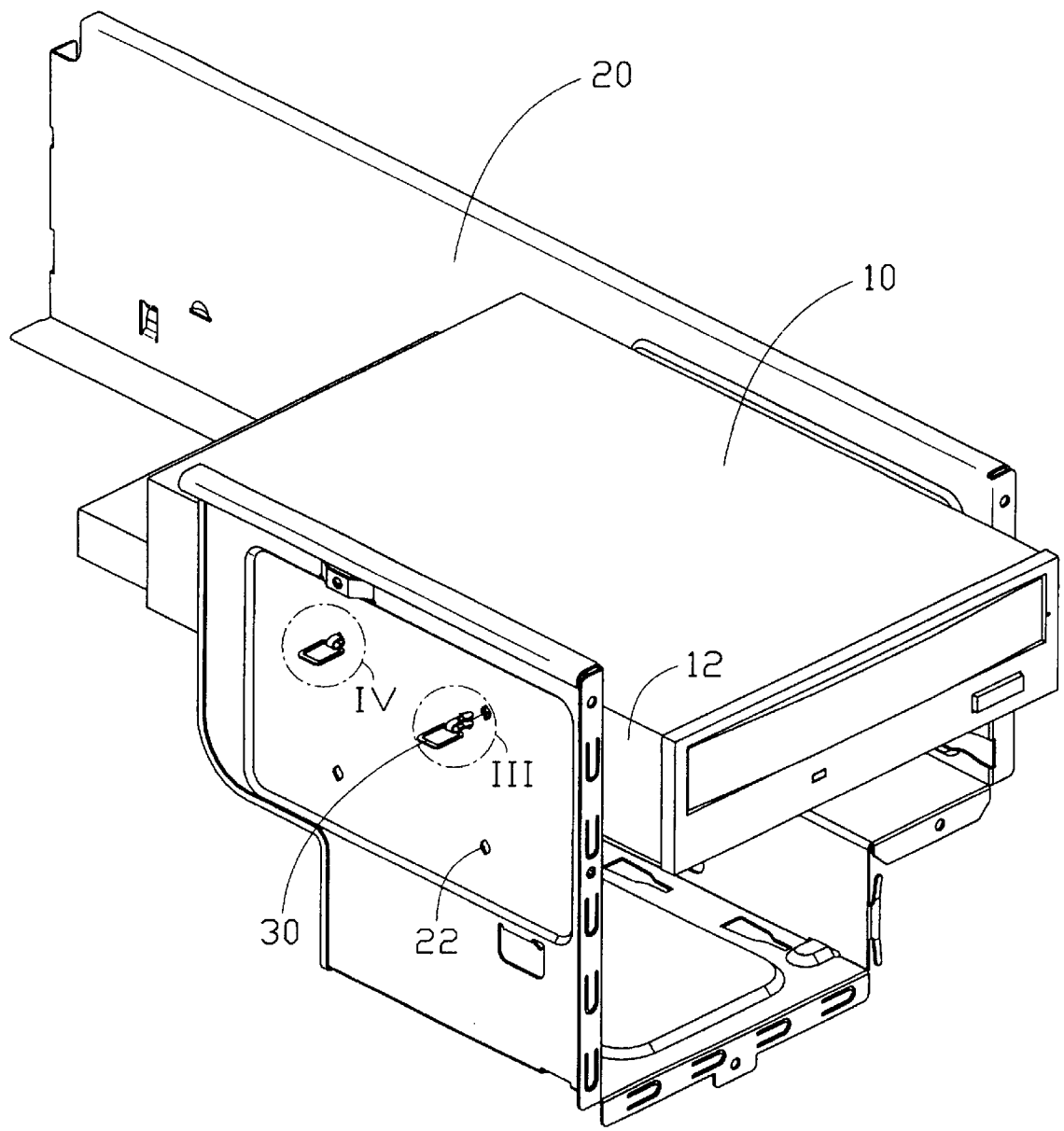
FIG. 1 is a partly assembled view of a pair of fasteners in accordance with a preferred embodiment of the present invention securing a data storage device to a bracket.
Figure 2:
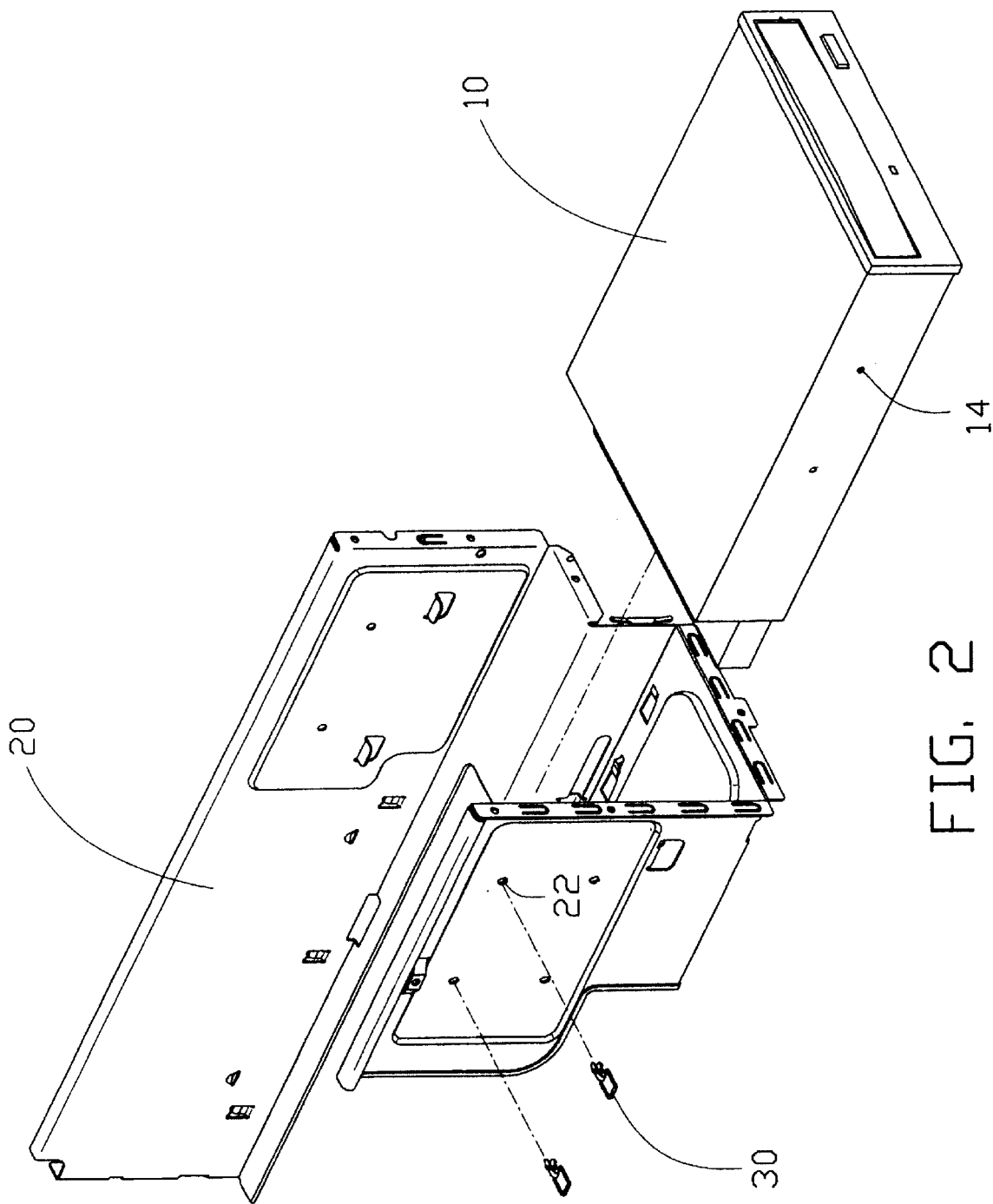
FIG. 2 is an exploded view of FIG. 1.

Reference will now be made to the drawing figures to describe the several embodiments of the present invention in detail.

Referring to FIGS. 1–4, a fastener 30 in accordance with a preferred embodiment of the present invention comprises a rectangular frame 31 and a base 32 integrally formed at a side of the frame 31. The frame 31 facilitates operation of the fastener 30. A data storage device 10 defines a plurality of holes 14 in opposite side panels 12 thereof. A bracket 20 receives the data storage device 10 therein. The bracket 20 defines a plurality of openings 22, corresponding to the holes 14 of the data storage device 10. A pair of cutouts 24 is defined in the bracket 20 at each opening 22. Each pair of cutouts 24 is disposed on opposite sides of each opening 22 respectively, with each cutout 24 being in communication with the opening 22. A plurality of fasteners 30 is elastically deflectably inserted into the openings 22 of the bracket 20 and the holes 14 of the data storage device 10, to thereby secure the data storage device 10 to the bracket 20.

Figure 3:
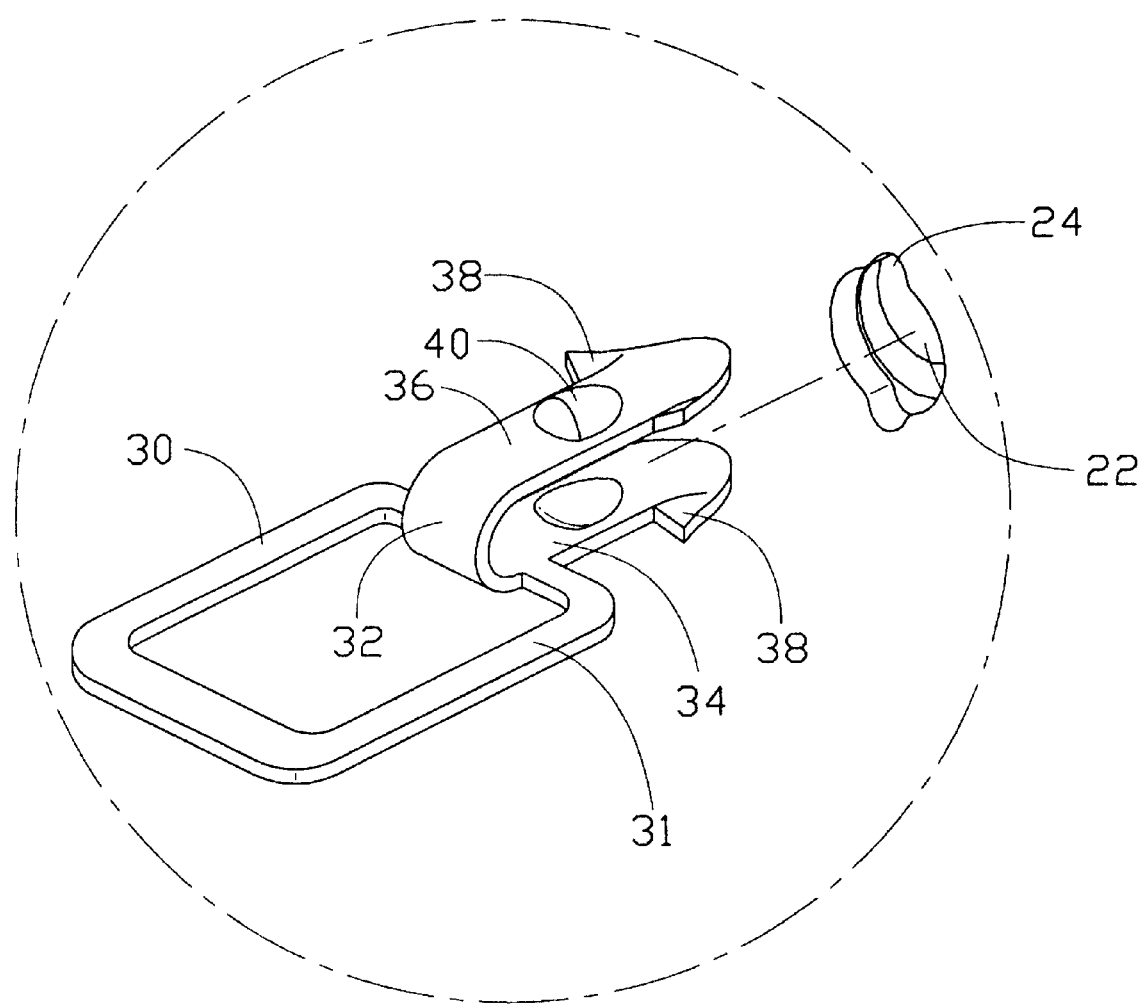
FIG. 3 is an enlarged view of the circled portion III of FIG. 1, showing one fastener ready to be engaged with the bracket and the data storage device.
Figure 4:
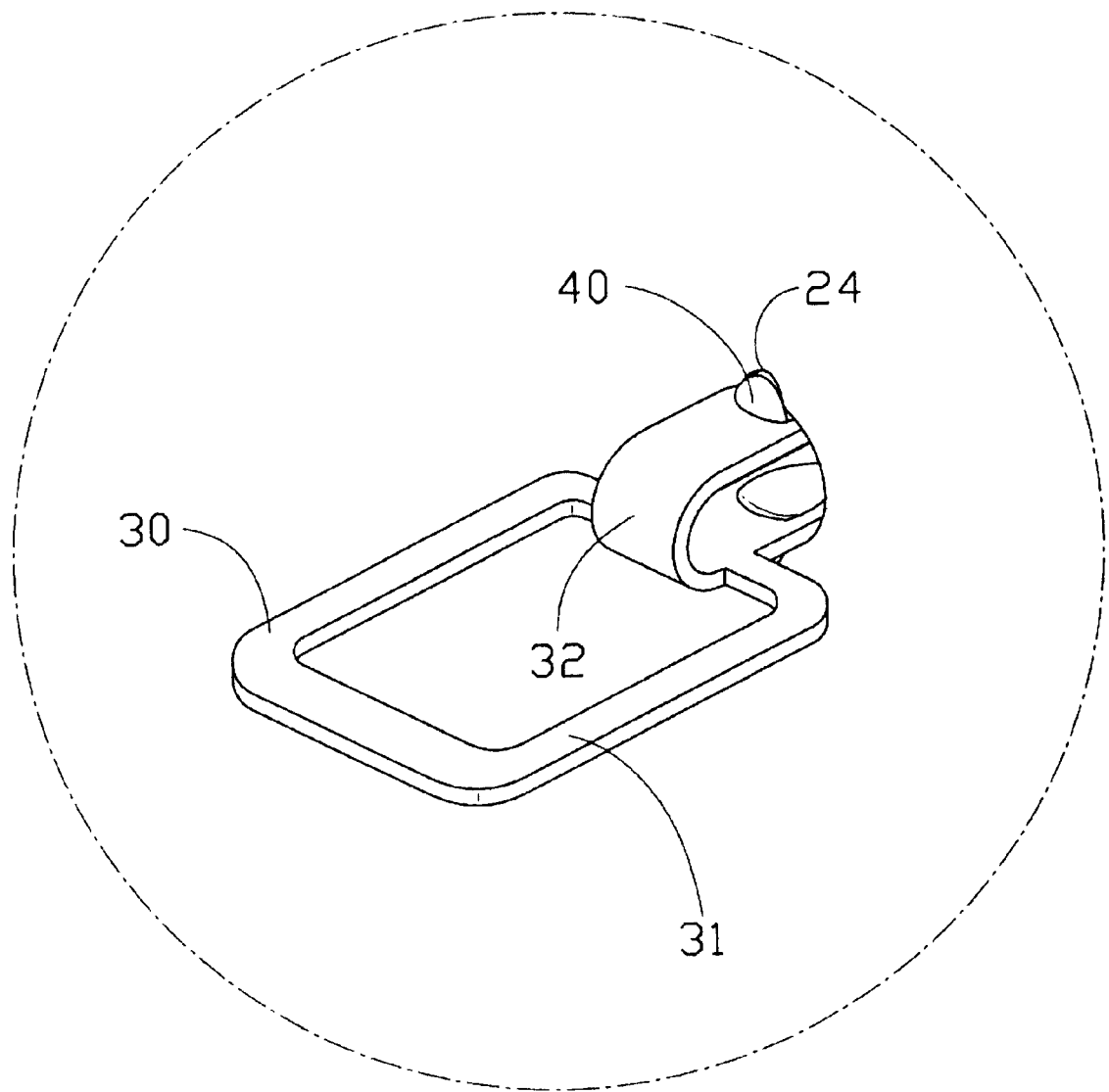
FIG. 4 is an enlarged view of the circled portion IV of FIG. 1, showing another fastener engaged with the bracket and the data storage device.

Referring particularly to FIG. 3, the base 32 of each fastener 30 has a generally U-shaped profile. A pair of first and second elastic arms 34, 36 extends horizontally from free ends of the base 32 respectively. The first and second arms 34, 36 are parallel to and spaced from each other. A pair of barbs 38 is respectively formed on opposite lateral sides of a free end of the first arm 34. The barbs 38 are respectively bent outwardly at an acute angle from the first arm 34. A protrusion 40 is form on an outer face of the first arm 34, generally between the barbs 38. The second arm 36 is a mirror image of the first arm 34. The second arm 36 thus also has a pair of barbs 38 and a protrusion 40.

In assembly, the data storage device 10 is received in the bracket 20, with the holes 14 of the data storage device 10 being aligned with the corresponding openings 22 of the bracket 20. The first and second arms 34, 36 of each fastener 30 are squeezed toward each other and inserted into the corresponding opening 22 and the corresponding hole 14, until the barbs 38 have completely entered the data storage device 10. The protrusions 40 of the fastener 30 are received in the corresponding cutouts 24. The protrusions 40 thus prevent the fastener 30 from being rotatingly displaced. The first and second arms 34, 36 are then released, and elastically return toward their original position relative to the base 32. The barbs 38 therefore interferentially clasp an inner surface of the side panel 12 of the data storage device 10 at a periphery of the corresponding hole 14. Thus, the fasteners 30 secure the data storage device 10 to the bracket 20.

Figure 5:
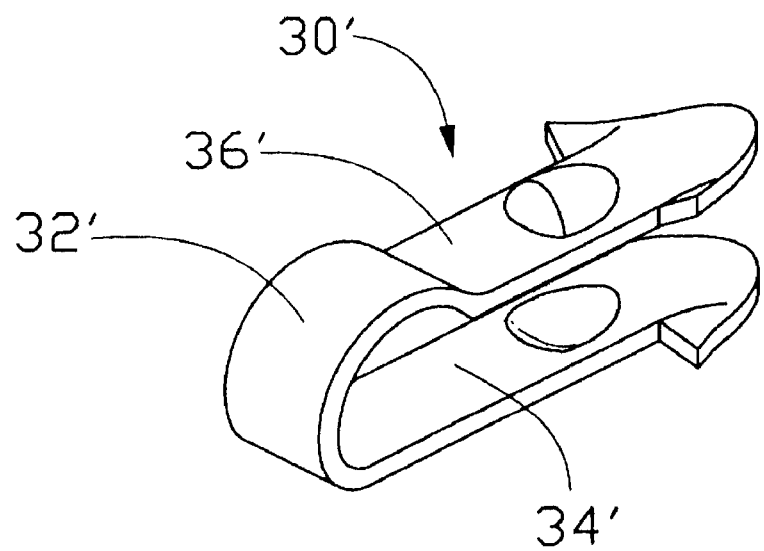
FIG. 5 is a perspective view of a fastener in accordance with an alternative embodiment of the present invention.

Referring to FIG. 5, a fastener 30' in accordance with an alternative embodiment of the present invention is similar to the fastener 30 of the preferred embodiment. The fastener 30" comprises a base 32' and a pair of first and second arms 34', 36'. However, the fastener 30' does not have a frame. The base 32' has a generally arcuate profile, and overlaps part of the first arm 34'. A length of the first arm 34' is approximately equal to a corresponding combined length of the base 32' and a second aim 36'. For further detailed description of the fastener 30', reference is made to the detailed description of the fastener 30 above, with due alteration of details.

Figure 6:
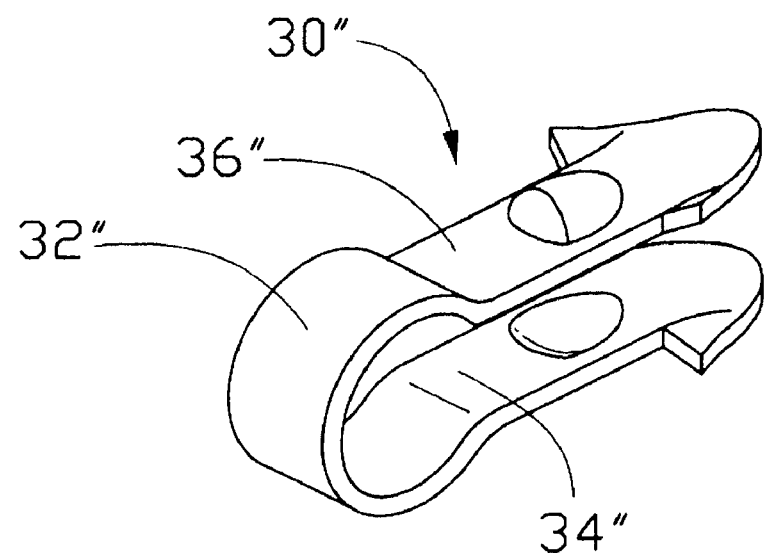
FIG. 6 is a perspective view of a fastener in accordance with a further alternative embodiment of the present invention.

Referring to FIG. 6, a fastener 30" in accordance with a further alternative embodiment of the present invention is similar to the fastener 30 of the preferred embodiment. The fastener 30" comprises a base 32" and a pair of first and second arms 34", 36". However, the fastener 30" does not have a frame. The base 32" of the fastener 30" has a generally C-shaped profile. For further detailed description of the fastener 30", reference is made to the detailed description of the fastener 30 above, with due alteration of details.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fastener for securing a data storage device to a bracket, the fastener comprising:
   a generally arcuate base;
   a first arm extending from an end of the base, at least one barb being formed on at least one of opposite lateral sides of a free end of the first arm; and
   a second arm extending from another end of the base, the second arm being generally parallel to the first arm, at least one barb being formed on at least one of opposite lateral sides of a free end of the second arm.

2. The fastener as claimed in claim 1, wherein a protrusion is formed on an outer face of at least one of the first and second arms, and each protrusion is formed near a corresponding barb.

3. The fastener as claimed in claim 1, wherein at least one of the first and second arms is elastically deflectable.

4. The fastener as claimed in claim 1, wherein the base has a generally U-shaped profile.

5. The fastener as claimed in claim 4, wherein the first and second arms are substantially mirror images of each other.

6. The fastener as claimed in claim 4, wherein the fastener further comprises a frame integrally formed with the base, for facilitating operation of the fastener.

7. The fastener as claimed in claim 6, wherein the frame extends from the base in a direction generally opposite to a direction in which the first and second arms extend from the base.

8. The fastener as claimed in claim 7, wherein the frame is generally rectangular.

9. The fastener as claimed in claim 4, wherein a length of the first arm is approximately equal to a corresponding combined length of the base and the second arm.

10. The fastener as claimed in claim 1, wherein the base has a generally C-shaped profile.

11. The fastener as claimed in claim 10, wherein the first and second arms are substantially mirror images of each other.

12. A data storage device assembly, comprising:
    a data storage device comprising a pair of opposite side panels, each side panel defining at least one hole therein;
    a bracket receiving the data storage device therein, the bracket defining at least two openings, each of the at least two openings being aligned with a corresponding hole of the data storage device; and
    at least two fasteners, wherein each of the at least two fasteners comprises a base and a pair of elastically deflectable first and second arms extending from the base, and at least one barb formed on at least one of opposite lateral sides of a free end of each of the first and second arms, and wherein the first and second arms are elastically deflected towards each other and inserted into a corresponding opening of the bracket and a corresponding hole of the data storage device, and the at least one barb interferentially clasps an inner surface of a corresponding side panel of the data storage device at a periphery of the corresponding hole, whereby the data storage device is secured to the bracket.

13. The data storage device assembly as claimed in claim 12, wherein at least two cutouts are defined in the bracket, each cutout being in communication with a corresponding opening.

14. The data storage device assembly as claimed in claim 13, wherein a protrusion is formed on an outer face of at least one of the first and second arms of said each of the at least two fasteners, the protrusion is formed near a corresponding barb, and the protrusion is received in a corresponding cutout of the bracket, thereby preventing said each of the at least two fasteners from being rotatingly displaced.

15. The data storage device assembly as claimed in claim 12, wherein the base of said each of the at least two fasteners is generally arcuate, and wherein the first and second arms of said each of the at least two fasteners extend from opposite free ends of the base.

16. The data storage device assembly as claimed in claim 12, wherein the first and second arms are substantially parallel to and spaced from each other, to allow the first and second arms to be elastically deflected toward each other.

17. A data storage device assembly, comprising:
    a data storage device comprising a pair of opposite side panels each defining a hole therein;
    a bracket in which the data storage device is received, the bracket comprising two openings each being in alignment with a corresponding hole; and
    two fasteners each extending through a corresponding aligned opening and hole to fasten the data storage to the bracket, each of the two fasteners having an arcuate base and two arms extending from the base, the two arms being elastically deflectable towards each other, each of the two arm having a barb abutting against an inner surface of a corresponding side panel of the data storage device and a protrusion fitting in a cutout defined in the bracket in communication with a corresponding opening.

18. The data storage device assembly in accordance with claim 17, wherein the arcuate base is substantially U-shaped.

19. The data storage device assembly in accordance with claim 17, wherein the arcuate base is substantially C-shaped.

20. The data storage device assembly in accordance with claim 17, wherein the fasteners further comprise a frame connected with the base and extending in a direction opposite to a direction in which the arms extend from the base, the frame being generally rectangular.

* * * * *